Apr. 3, 1923. 1,450,524
W. SWANN
MEANS FOR GRIPPING WIRE OR THE LIKE
Filed June 29, 1920
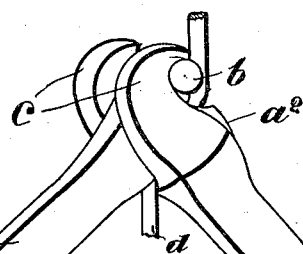
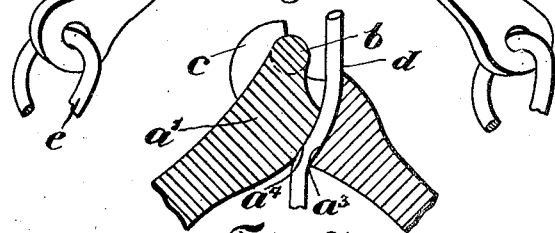
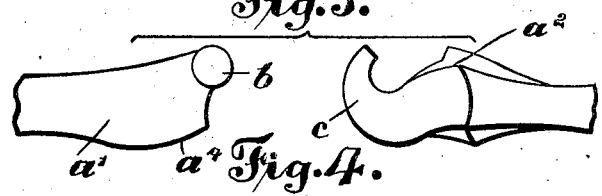
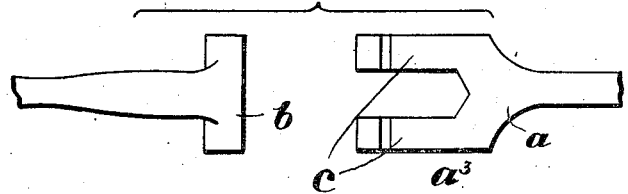
Inventor
William Swann,
By B. Singer Atty Patented Apr. 3, 1923.

1,450,524

UNITED STATES PATENT OFFICE.

WILLIAM SWANN, OF WALSALL, ENGLAND, ASSIGNOR TO CHARLES TRAWFORD, LIMITED, OF WALSALL, ENGLAND.

MEANS FOR GRIPPING WIRE OR THE LIKE.

Application filed June 29, 1920. Serial No. 392,769.

*To all whom it may concern:*

Be it known that I, WILLIAM SWANN, a subject of the Kingdom of Great Britain, residing at Caldmore Road Works, Caldmore Road, Walsall, in the county of Stafford, England, have invented Improvements in or Relating to Means for Gripping Wire or the like (for which I have filed an application in Great Britain October 29, 1913, Serial No. 24,520/13, which was sealed January 14, 1915, and in Germany April 9, 1920), of which the following is a specification.

This invention comprises certain improvements in or relating to means for gripping wire or the like and has for its purpose to provide a device which is exceptionally simple in construction and manipulation and by the use of which wire, rope and the like may be held or gripped in a very effective manner, such device being particularly useful when it is desired to pull or draw wire or the like into a taut or straight condition.

According to the present invention a gripping device is provided comprising two lever members adapted to be separably and removably connected together by causing trunnions on the one lever to engage with hook-shaped arms or bifurcations on the other lever in combination with a concave face on the one lever and a convex face on the other lever between which faces the wire is adapted to be gripped.

I am aware that it is not broadly new per se to furnish a device for gripping wire consisting of levers or links separably connected together by causing trunnions on the one lever to engage with hook-shaped arms on the other lever, and also that it is not broadly new per se to furnish on a wire gripping device concave and convex faces between which the wire is adapted to be gripped. The present invention, however consists in the combination of a trunnion and hook connection and concave and convex jaws between which the wire is gripped.

In order that this invention may be clearly understood and more readily carried into practice, reference may be had to the appended explanatory sheet of drawings, upon which:—

Figure 1 is a view in perspective of a device according to this invention in the operative position.

Figure 2 is a longitudinal section through the gripping jaws of the device showing same in operation.

Figure 3 illustrates in side elevation the two jaw parts of the device.

Figure 4 illustrates in plan the parts shown in Figure 3.

According to a convenient embodiment of this invention two arms, levers, links or the like $a$ are furnished which are advantageously of flat or substantially flat formation, one of which is formed or provided at its one extremity with a transversely arranged cylindrical projecting portion furnishing two oppositely extending cylindrical lugs or trunnions $b$ projecting at each side of the lever extremity. With these projecting lugs $b$ two hook-shaped portions $c$ formed at the one extremity of the other lever or like member are adapted to engage, said hook-shaped portions $c$ being provided by constructing the lever extremity of bifurcated or forked formation, the two parallel extending arms of same being of hook or claw shape.

The bifurcated extremity $a^2$ of the one lever and that portion $a^1$ of the extremity of the other lever disposed immediately beneath or adjoining the cylindrical transverse projection $b$ form the two gripping jaws of the device for gripping the wire $d$ or the like to be operated upon. The wire $d$ to be gripped is placed between the arms of the bifurcated extremity $a^2$ of the one lever and the hooks $c$ upon said bifurcated extremity are caused to engage with the projecting lugs or trunnions $b$ upon the other lever extremity, the two levers $a$ extending out from the point of fulcrum in a divergent position. By swivelling the levers $a$ upon their fulcrum to a less divergent position, the one edge or inner face $a^4$ of the one jaw $a^1$ is brought close up against the shoulder portion or base $a^3$ of the U between the bifurcated arms of the other jaw $a^2$ and the wire $d$ is thereby tightly and securely gripped between the two adjacent portions or faces $a^3$, $a^4$.

The one jaw or lever extremity $a^1$ which is adapted to be accommodated between the bifurcated hooked arms $c$ of the second jaw $a^2$ is advantageously of thickened or enlarged formation, and the space between the arms of the bifurcated jaw $a^2$ is conveniently such as to permit said enlarged jaw $a^1$ to be readily assembled and removed at will.

The base of the U formed by the bifurcated jaw $a^2$ is also advantageously enlarged or thickened so as to form a substantial bearing face $a^3$ for the wire $d$, and said bearing face $a^3$ is of concave formation and the engaging face $a^4$ of the other jaw $a^1$ is of convex formation. By this means the wire $d$ disposed between the two jaws is gripped in a firmer and tighter manner, an abrupt bend or curve being formed in the wire in that part of the wire held between the jaws.

If desired, however the concave and convex operating faces of the two jaws may be corrugated or serrated, or if desired two concave and convex faces may be furnished upon same.

The two levers $a$ of the device may be either of straight or curved formation, and at the outer or free extremities of same, suitable apertures are provided for enabling one or more chains, rods, wires, or the like $e$ to be attached to the levers.

The face $a^3$ of the one jaw $a^2$ which constitutes one of gripping faces may be of shallow V or equivalent formation in cross section as shown, or if desired same may be of arc or like shape. By forming the face $a^2$ of V or like cross section the wire $d$ is gripped firmly within the base or angle V.

In the operation of the device the wire $d$ is disposed in position between the jaws $a^1$ $a^2$ and a pulling or drawing action is exerted upon the chain or chains $e$ attached to the levers $a$ which causes said levers $a$ to assume a less divergent position in relation to each other, thereby bringing the operating faces $a^3$, $a^4$ of the jaws into close proximity with each other and tightly gripping the wire $d$ between same; the greater the tension or pulling action exerted upon the chain $e$ the greater the grip exerted by the jaws upon the wire.

In cases where the lever members $a$ of the device are of curved formation the outer or free extremities of same are advantageously bent into a convergent position, and the extremities within which the apertures are provided for the connection of chains $e$ or the like may if desired be twisted into a plane at right angles to the plane of the remaining part of the levers.

What I claim as my invention and desire to secure by Letters Patent is:—

A wire gripping device comprising a pair of levers one having a convex face near one end and also having a pair of oppositely extending trunnions at said end, and the other having a concave face opposed to the convex face of the first named lever and also having a pair of spaced hooks arranged on opposite sides and directly at one end of the first named lever, engaging said trunnions, and thereby pivotally detachably connecting said levers together, the said convex and concave faces of said levers being spaced apart to receive a wire between them.

In witness whereof I have hereunto set my hand.

WILLIAM SWANN.